(12) United States Patent
Towsley

(10) Patent No.: US 9,894,853 B1
(45) Date of Patent: Feb. 20, 2018

(54) ANTI-SIPHON VALVE WITH FREEZE PROTECTION

(71) Applicant: Bryan L. Towsley, Berthoud, CO (US)

(72) Inventor: Bryan L. Towsley, Berthoud, CO (US)

( * ) Notice: Subject to any disclaimer, the term of this patent is extended or adjusted under 35 U.S.C. 154(b) by 0 days.

(21) Appl. No.: 15/357,997

(22) Filed: Nov. 21, 2016

Related U.S. Application Data

(63) Continuation of application No. 14/507,716, filed on Oct. 6, 2014, now Pat. No. 9,504,214.

(51) Int. Cl.
| | |
|---|---|
| *E03C 1/10* | (2006.01) |
| *F16K 24/00* | (2006.01) |
| *A01G 25/16* | (2006.01) |
| *F16K 24/06* | (2006.01) |
| *F16K 24/02* | (2006.01) |

(52) U.S. Cl.
CPC .............. *A01G 25/16* (2013.01); *E03C 1/102* (2013.01); *E03C 1/104* (2013.01); *F16K 24/06* (2013.01); *F16K 24/02* (2013.01); *Y10T 137/3149* (2015.04); *Y10T 137/3331* (2015.04)

(58) Field of Classification Search
CPC . E03C 1/10; E03C 1/102; E03C 1/104; F16K 24/02; F16K 24/06; E03B 9/027; Y10T 137/3149; Y10T 137/3331
See application file for complete search history.

(56) References Cited

U.S. PATENT DOCUMENTS

| | | | | | |
|---|---|---|---|---|---|
| 3,286,722 | A | * | 11/1966 | Royer | A01G 25/16 137/218 |
| 3,818,929 | A | * | 6/1974 | Braukmann | F16K 15/00 137/218 |
| 3,965,922 | A | * | 6/1976 | McCornack | F16K 21/10 137/218 |
| 4,239,180 | A | * | 12/1980 | Thuries | F16K 24/06 251/51 |
| 5,125,429 | A | * | 6/1992 | Ackroyd | E03C 1/104 137/218 |
| 6,035,458 | A | * | 3/2000 | Tarzia | F16K 11/044 137/218 |
| 6,904,931 | B2 | * | 6/2005 | Stephens | D06F 39/083 137/218 |
| 7,004,186 | B2 | * | 2/2006 | Ferrel | F16K 1/12 137/12 |
| 7,013,910 | B2 | * | 3/2006 | Tripp | E03C 1/106 137/218 |
| 7,575,016 | B2 | * | 8/2009 | Hecking | F24D 3/10 137/115.16 |
| 7,934,515 | B1 | * | 5/2011 | Towsley | E03B 7/12 137/217 |
| 9,504,214 | B1 | * | 11/2016 | Towsley | A01G 25/16 |

* cited by examiner

*Primary Examiner* — Craig Schneider
*Assistant Examiner* — Kevin Barss
(74) *Attorney, Agent, or Firm* — Ramon L. Pizarro; Edwin H. Crabtree

(57) ABSTRACT

An anti-siphon system for use with an irrigation system, such as lawn sprinkling system is disclosed. The system includes a backflow prevention valve with a bonnet- and poppet valve system with a conical spring that biases a lower poppet valve head, and engages the valve body. The use of the conical spring simplifies the mechanism, while providing reliable backflow prevention.

7 Claims, 3 Drawing Sheets

VENTING/ANTI-BACKFLOW OPERATION

IRRIGATION OPERATION

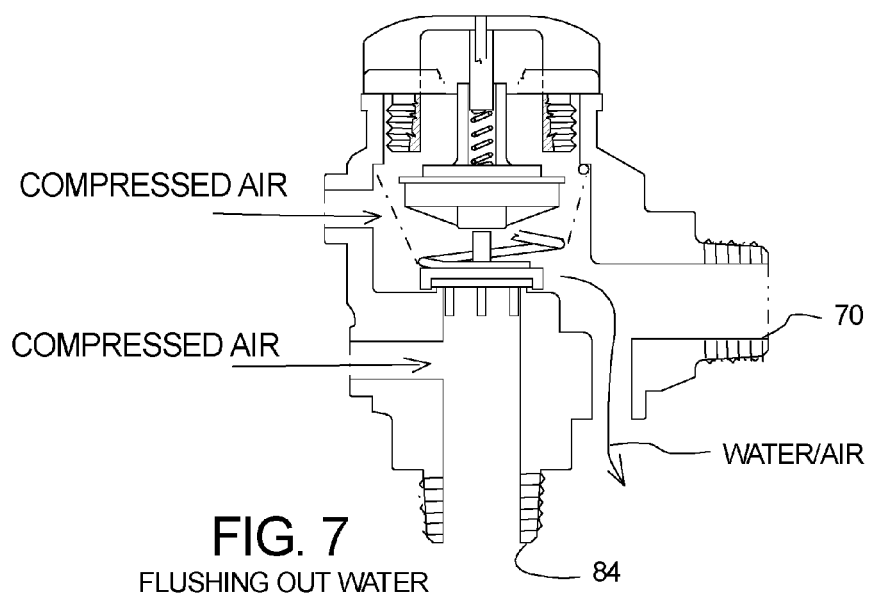
FIG. 7
FLUSHING OUT WATER
FOR WINTERIZATION
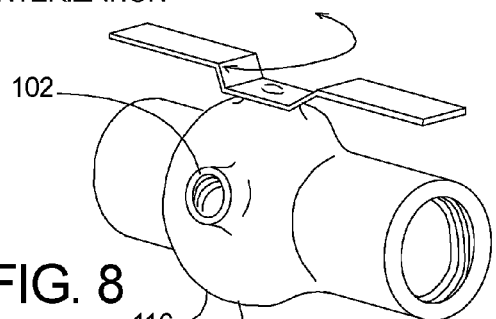
FIG. 8
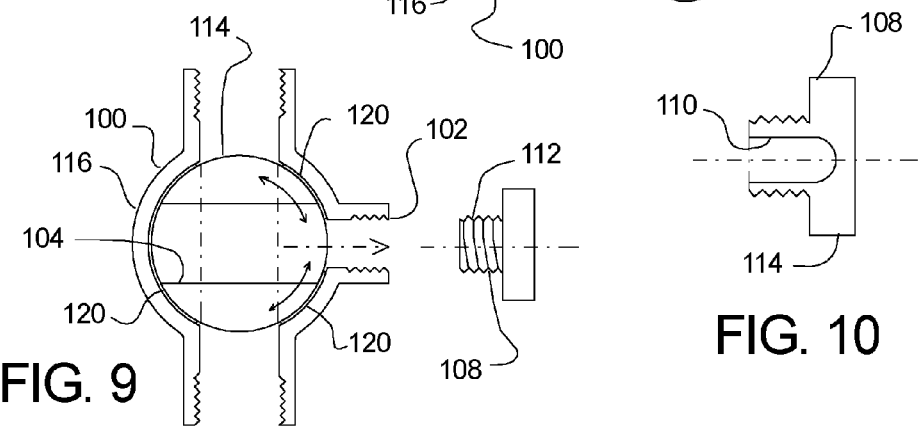
FIG. 9
FIG. 10

ANTI-SIPHON VALVE WITH FREEZE PROTECTION

REFERENCE TO RELATED APPLICATIONS

This application claims the benefit of my U.S. non provisional application titled ANTI-SIPHON VALVE WITH FREEZE PROTECTION, having Ser. No. 14/507,716, filed Oct. 6, 2014, now U.S. Pat. No. 9,504,214, incorporated herein by reference.

BACKGROUND OF THE INVENTION

(a) Field of the Invention

This application relates to an anti-siphon valve system, and more particularly for a system that facilitates winterization of the valve system and which includes an improved anti-siphon valve system.

(b) Discussion of Known Art

Anti-siphon valves are widely used with irrigation systems. A popular anti-siphon valve is used as part of FEBCO Series 765 Pressure Vacuum Breakers. These anti-siphon devices are discussed in my U.S. Pat. No. 7,934,515, ("the '515 patent") issued May 3, 2011, and which is incorporated herein by reference in its entirety.

While the arrangements discussed in my '515 patent perform as expected, these devices are designed for service by trained technicians or experienced personnel. Additionally, these devices are widely used as part of home sprinkler or irrigation systems, which means that a technician must visit the residence where the system is installed and properly "winterize" the system in areas where freezing is likely to occur during the winter months. This winterization involves the removal of water from the entire sprinkler system, including the anti-siphon valves used with the system. Winterization is typically carried out with the use aid of a large-capacity air compressor that is used to blow out water that is found in the irrigation system after the main water line to the irrigation system has been closed.

However, it often happens that sudden cold fronts strike very quickly in fall and spring months, which results in an immediate need for winterization of a very large number of irrigation systems in hopes of avoiding freezing of water trapped in the irrigation system. This sudden need for assistance from trained technicians outstrips the supply of available technicians, and results in failed attempts at "do-it-yourself" winterizing by homeowners. The result is that water that is trapped in the irrigation system freezes and causes serious damage to components of the irrigation system.

One of the components that commonly damaged by freezing before winterization is the anti-siphon valve, which is often referred to as the "anti-backflow" device. Municipalities almost always require the installation of anti-siphon devices as part of irrigation systems. The function of the anti-siphon device is to allow air into the system once water pressure is turned off from the house or other building connected the municipal water system. Allowing air into the system results in draining of much of the water from the system, and ensures that a siphon is not created between the municipal water system and the irrigation system.

Homeowners can typically locate and shut off the main water valve to their irrigation system, but are often unable to drain water that remains in the backflow devices that are part of the irrigation system. Similarly, homeowners may not have the equipment needed to thoroughly remove potentially harmful levels of water that may remain trapped in valves, and particularly in ball valves that are commonly used in irrigation systems. As a consequence of the inadequate drainage, the backflow devices are then damaged or destroyed by the expansion of freezing water trapped in the devices.

Therefore there remains a need for a simple device that allows homeowners to quickly and easily drain water from major components of an irrigation system without the need of a high-capacity air compressor, or special tools and skills.

Additionally, there remains a need for a simplified anti-backflow installation system that can be quickly drained of water with a few common hand tools, such as with a screwdriver and an adjustable spanner.

Still further, there remains a need for a simplified bonnet and lower poppet valve arrangement that can be used with the body of well-known anti-backflow devices, such as the FEBCO Series 765 Pressure Vacuum Breakers. The simplified bonnet and lower poppet arrangement using fewer parts than are used with known devices, and allowing easier and less expensive repair of anti-backflow devices once they fail due to age or freezing.

SUMMARY

It has been discovered that the problems left unanswered by known art can be solved by providing an anti-backflow installation that includes:

A vertical supply line terminating in an upper end;

A first ball valve attached to the upper end of the vertical supply line, the first ball valve having an inlet, an outlet, and a side pressure relief port positioned between the inlet and the outlet, the side pressure relief port being a threaded aperture having a polymer plug that is threaded into the side pressure relief port;

A backflow prevention valve, the backflow prevention valve having a vertical inlet, a horizontal outlet, and three drainage nipples to allow drainage without the use of compressed air, the backflow prevention valve further having a bonnet and lower poppet valve that eliminates components found in known devices, and results in a simpler arrangement that is easier to service.

According to a preferred embodiment of the invention, the polymer plug is made of a translucent acrylic polymer. The polymer plug will preferably include a threaded male portion that is adapted for treaded attachment to the side pressure relief port of the ball valve. Additionally, the polymer plug will preferably include a translucent head that will have a generally flat top surface and at least two parallel sides that are adapted for accepting a spanner wrench or for engagement with a pair of pliers. The male portion of the polymer plug will preferably include a counter bore that extends along the center of the male portion towards the top surface. The counter bore will allow any water that is trapped in the ball valve to travel towards the top surface, which will facilitate quick inspection of the ball valve to determine whether the ball valve is holding water and needs to be drained.

Additionally, it is contemplated that the ball valves will include bushings and body design that will minimize the amount of water that can remain trapped between the ball and the body of the valve. According to a preferred example of the invention, it is contemplated that the bushings used with the ball valves of the disclosed invention will be configured fill much of the space found between the spherical gate of the ball valve and the body of the ball valve. This configuration will minimize the amount of water that can be trapped in this space, and thus minimize the possibility of rupturing the body of the ball valve due to freezing of trapped water. Additionally, it is contemplated that the disclosed invention will be equipped with a polymer plug that will be aligned with the passage in the spherical gate when the ball valve is in the closed position. This arrangement will allow freezing water that is trapped in the passage to expand against the polymer plug, pushing the plug from the body of the valve, and thus alleviating pressure that may lead to damage to the body of the valve. Still further, it is contemplated that the sacrificial polymer plug will be made from a transparent or translucent material, which will allow the homeowner to visually inspect the plug to verify if there is water trapped in the ball valve.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 7 illustrates the use of the upper flushing nipple and the lower flushing nipple 88 to urge water from the anti-backflow device during winterization. The figure also shows the flow path of water being flushed through the drainage nipple provided with the disclosed invention.

FIG. 8 illustrates an example of a ball valve used with the disclosed invention. The ball valve having a side aperture that aligns with the passage in the ball gate of the ball valve, as shown in FIG. 9.

FIG. 9 illustrates the movement of the passage in the ball gate of the ball valve and the cooperation of the sacrificial polymer plug that is used with the disclosed ball valve to minimize the possibility of damage from freezing water that may be found in the passage when the valve is in the closed position.

FIG. 10 is a cross-section of a preferred example of the polymer plug, and illustrates the counter-bore incorporated into the polymer plug to facilitate visual inspection of the ball valve and detect water in the passage of the ball gate.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
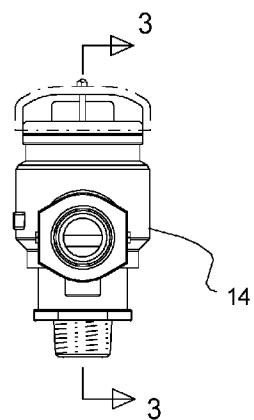
FIG. 1 illustrates an anti-siphon valve for use with the disclosed system.
Figure 1A:
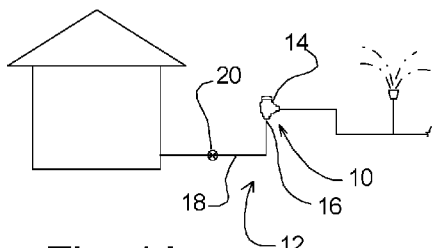
FIG. 1A is a schematic diagram showing the positioning of the anti-siphon valve on the supply line of the irrigation system and the location of the main shut-off valve as well as the anti-siphon valve in relation to the home or building that uses the irrigation system.
Figure 2:
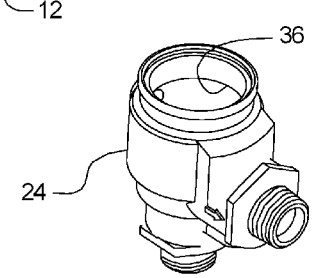
FIG. 2 illustrates the body of the disclosed anti-siphon valve, and also illustrates the spring support shoulder for the disclosed check-valve spring arrangement.

Turning now to FIGS. 1 and 1A where an anti-backflow system 10 for an irrigation system 12 has been illustrated. The anti-backflow system 10 allows pressure equalization of the pressure within backflow prevention valve 14 and the surrounding atmosphere. As can be understood from FIG. 1A, it is contemplated that the backflow prevention valve 14 will be installed from the upper end 16 of a generally vertical water supply line 18. The water supply line 18 is controlled through a supply valve 20, which allows water to flow though the supply line 18, into the backflow prevention valve 14, and then into the irrigation system 12. Due to the fact that the irrigation system 12 may produce a backflow of water towards the supply line 18, or create a siphon against the supply line 18 when the water is shut off, the backflow prevention valve 14 acts as both an anti-backflow device and an anti-siphon device. However, despite the fact that the backflow prevention valve 14 performs both functions, it will be referred to here simply as a backflow prevention valve.

Referring now to FIGS. 1 and 2-5 it will be understood that the backflow prevention valve 14 used with the disclosed system will include a body 24 with lower chamber 26 and an upper chamber 28. The upper chamber 28 has been designed to support a bonnet 30 that cooperates with an upper poppet valve 32. The bonnet 30 is supported from a support mouth 34 that is part of the body 24 of the backflow prevention valve 14.

Figure 4:
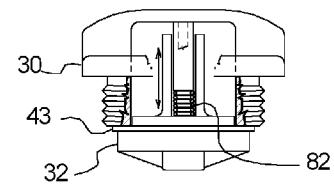
FIG. 4 is a sectional view of the poppet valve used with the disclosed anti-backflow device, and shows the upper poppet valve in the closed position, as would be the case when there is water pressure in the upper chamber of the anti-backflow device.

As illustrated in FIG. 4, the support mouth 34 extends down into the upper chamber 28 and ends next to a spring support shoulder 36. The spring support shoulder 36 is used to restrain a conical spring 38 that is used to urge a lower poppet valve 40 against a lower poppet valve seat 42.

Figure 3:
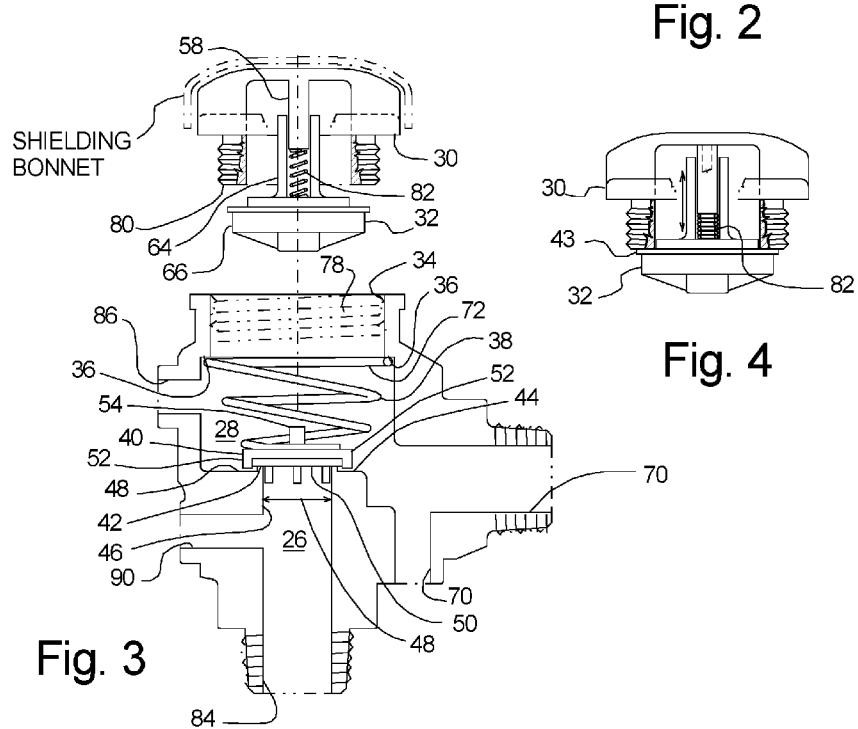
FIG. 3 is a sectional view illustrating the main components of the disclosed anti-backflow device.

The upper chamber also has a lower poppet valve landing 44 that is positioned below the bonnet support mouth 34. The lower poppet valve landing 44 has a flow aperture 46 that is positioned directly below the bonnet support mouth 34 and provides fluid communication between the upper chamber 28 and the lower chamber 26, so that water may flow from the lower chamber 26 and into the upper chamber 28 when water from the supply valve 20 is allowed to flow towards the disclosed anti-backflow valve 14. FIG. 3 also shows that the flow aperture 46 is surrounded by a perimeter 48 that faces the upper chamber 28. The perimeter 48 defines a lower poppet valve seat 42 that accepts the lower poppet valve 40.

Referring now to FIGS. 3-7, it will be understood that the lower poppet valve 40 has a lower poppet valve head 52, which is adapted for creating an airtight seal against the lower poppet valve seat 52. The creation of the airtight seal against the lower poppet valve seat 52 prevents air from being drawn towards lower chamber 26, and the supply valve 20, when water pressure in the lower chamber 26 drops below the pressure in the upper chamber 28. Additionally, FIGS. 3-7 illustrate that the lower poppet valve will preferably include a lower poppet valve post 54. The lower poppet valve post 54 will extend up from the lower poppet valve head 52 when the lower poppet valve is positioned, seated, against the lower poppet valve seat 42. It is contemplated that sealing devices such as rubber gaskets 43 may be used between the lower poppet valve seat 42 and the lower poppet valve head 52.

Referring once again to FIG. 3, it will be understood that lower poppet valve post 54 will cooperate with the upper poppet valve 32, and push up on the upper poppet valve 32 when sufficient water pressure exists in the lower chamber 26. Additionally, it will be understood that the conical spring 38 will extend around the upper poppet valve 32 while urging the lower poppet valve 40 towards the lower valve poppet valve seat 42. This arrangement allows the conical spring 38 to retain the lower poppet valve 40 centered over the poppet valve seat 42, while eliminating the need for additional poppet valve support structure, as used with known devices. Additionally, the spring support shoulder 36, which accepts and retains the large diameter coils 72 of the conical spring 38.

FIGS. 3-6 also illustrate that the disclosed invention will accept the bonnet 30 includes a bonnet support threaded portion 78 that engages the bonnet support mouth 34. Additionally, the bonnet 30 will also support the upper poppet valve 32 in a manner that allows the upper poppet valve 32 to be urged away from an upper poppet valve seat 80 against. The upper poppet valve 32 will have an upper poppet valve support post 58 that accepts the upper poppet valve stem 64 in a telescopic manner. An upper poppet valve spring 82 is positioned between the upper poppet valve stem 64 and the upper poppet valve support post 58, so that the upper poppet valve head 66 is urged away from the upper poppet valve seat 80, and towards the lower poppet valve post 54.

In operation, sufficient water pressure in the lower chamber 26 will lift the lower poppet valve head 52 away from the lower poppet valve seat 42, and thus allowing water to flow from the lower chamber 26 to the upper chamber 28. The lifting of the lower poppet valve 52 will also cause the lower poppet valve post 54 to push the upper poppet valve head 66 against the upper poppet valve seat 80, closing the support mouth 34, so that water cannot flow out through the support mouth 34. With the support mouth 34 closed, water is forced to flow from the upper chamber 28, through a horizontal outlet 88 and onto the rest of the irrigation system 12.

Figure 5:
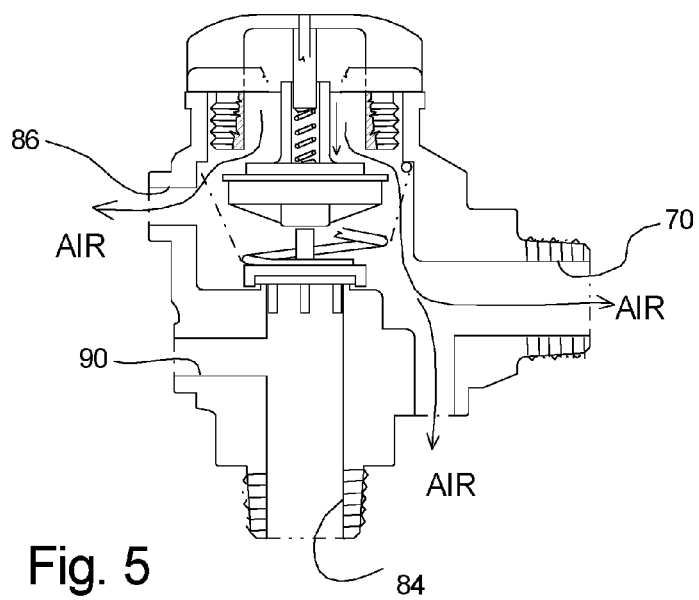
FIG. 5 illustrates the condition where water to the irrigation system has been shut off, and the upper poppet valve is in the open position, allowing the upper chamber access to the surrounding atmosphere, and thus preventing siphoning of water by adjacent sections of water line.
Figure 6:
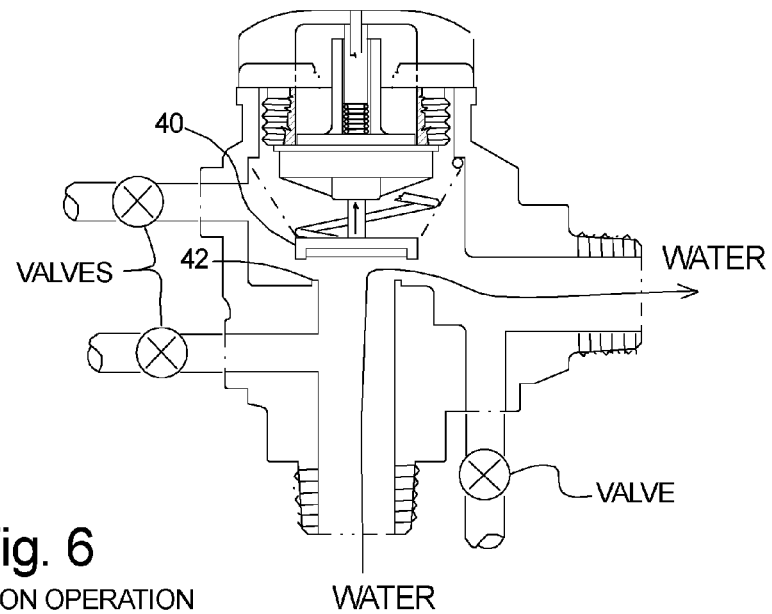
FIG. 6 illustrates the disclosed anti-backflow device with the upper poppet valve in the closed position, and the lower poppet valve is in the open position, allowing water to enter the upper chamber of the anti-backflow device.

FIGS. 3, 5 and 6 also show that the body 24 of the disclosed anti-backflow valve 14 has a vertical inlet 84 that is positioned below the flow aperture 46. The vertical inlet 84 allows water to flow from vertical water supply line 18 and into the lower chamber 26.

FIGS. 3, 5 and 6 also show that in order to facilitate winterization of the disclosed system, an upper flushing nipple 86 that provides fluid communication from the atmosphere to the upper chamber 28 is provided. The upper flushing nipple 86 will allow a technician to deliver compressed air directly into the upper chamber 28 in order to ensure thorough purging of any water found in the upper chamber 28 for the purpose of winterizing the disclosed system. Additionally, a drainage nipple 70 that is positioned between the vertical inlet 84 and the horizontal outlet 88 to provide fluid communication between the upper chamber 28 and the atmosphere is also provided to facilitate drainage of any water that may remain between the lower poppet valve seat 42 and the horizontal outlet 88.

Still further, FIGS. 3, 5 and 6 also show that a preferred embodiment will also include a lower flushing nipple 90 that provides fluid communication from the atmosphere to the lower chamber 26. The lower flushing nipple 90 is preferably positioned between the vertical inlet 84 and the lower poppet valve seat 42, to that water can be flushed from the lower chamber 26.

Referring now to FIGS. 8-10 it will be understood that the disclosed system may be used with freeze-tolerant ball valves 100 connected to the vertical inlet 84 and/or the horizontal outlet 70. The freeze tolerant ball valves will have a side port 102 that aligns with the ball-valve passage 104 when the ball valve 106 is in the closed position, illustrated in FIG. 9. The side port 102 will preferably be plugged with a translucent polymer plug 108, further illustrated in FIG. 10.

FIG. 10 illustrates that according to a preferred example of the translucent polymer plug 108, the translucent polymer plug 108 will include a counter bore 110 extends through a threaded male portion 112 of the translucent polymer plug 108, and ending within or near the head 114 of the translucent polymer plug 108. A purpose for making the translucent polymer plug 108 from a translucent material is that a translucent material will allow a homeowner to visually inspect the ball valve 100 to see if there is any water trapped within the ball valve 100. If there is water trapped within the ball valve 100, then the user may simply remove the translucent polymer plug 108 and allow the water to drain, and thus preventing damage to the ball valve 100 from freezing of the water trapped in the ball passage 104. Additionally, it has been discovered that if trapped water does freeze in the ball valve while the valve is in the closed position, the water will primarily expand along the axis of the ball passage 104 and the counter bore 110, forcing the translucent polymer plug 108 out from the side port 102. Ice trapped in the ball passage 104 and the counter bore 100 will support the translucent polymer plug 108 as it is forced out from the side port 102, and thus keep translucent polymer plug 108 from falling to the ground.

Additionally, it is contemplated that the freeze-tolerant ball valve 100 will also include a sealing bushing 120 that will take up much, if not all, of the space between the ball gate 114 and the ball valve body 116. This will prevent water from accumulating between ball gate 114 and the ball valve body 116, and thus avoiding this as a potential source of damage due to freezing.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. An anti-backflow system for an irrigation system, the anti-backflow system allowing pressure equalization with the surrounding atmosphere, and allowing water to flow into the irrigation system, the system being adapted for mounting to a generally vertical water supply line that terminates in an upper end, the anti backflow system comprising:
 a backflow prevention valve, the backflow prevention valve having:
  a body with lower chamber and an upper chamber, the upper chamber having a bonnet support mouth that extends down into the upper chamber and terminates next to a spring support shoulder, the upper chamber further having a lower poppet valve landing that is positioned below the bonnet support mouth, the lower poppet valve landing having a flow aperture that provides fluid communication between the upper chamber and the lower chamber, the flow aperture further having a perimeter that defines a lower poppet valve seat that accepts a lower poppet valve, the lower poppet valve having a lower poppet valve head and a lower poppet valve post, lower poppet valve post extending up from the lower poppet valve head when the lower poppet valve is positioned against the lower poppet valve seat;
  a bonnet that engages the bonnet support mouth, the bonnet having an upper poppet valve support post and an upper poppet valve seat;
  the bonnet supporting an upper poppet valve, the upper poppet valve having an upper poppet valve stem that is telescopically supported from the upper poppet valve support post, the upper poppet valve further having an upper poppet valve head that is adapted for seating on the upper poppet valve seat;
  the backflow prevention valve body further having:
   a vertical inlet below the flow aperture, the vertical inlet leading into the lower chamber;
   a horizontal outlet that extends from the upper chamber;
   an upper flushing nipple that provides fluid communication from the atmosphere to the upper chamber;
   a drainage nipple that is positioned between the vertical inlet and the horizontal outlet to provide fluid communication between the upper chamber and the atmosphere, the flushing nipple having a ball valve with a polymer plug that acts as a relief port in the event of freezing; and
   a lower flushing nipple that provides fluid communication from the atmosphere to the lower chamber, the lower flushing nipple being positioned between the vertical inlet and the upper flushing nipple, the drainage nipple having a ball valve with a polymer plug that acts as a relief port in the event of freezing;
 the system further having a lower poppet valve spring that extends from spring support shoulder and against the lower poppet valve head in order to urge the lower poppet valve head against the lower poppet valve seat, so that the lower poppet valve spring allows the lower poppet valve head to separate from the lower poppet valve seat and allow water to flow from the lower chamber into the upper chamber, where the water may then flow to the horizontal outlet.

2. An anti-backflow system according to claim 1 wherein the support stem that extends from the lower poppet valve extends into the lower poppet valve spring.

3. An anti-backflow system according to claim 2 wherein said lower poppet valve spring is a conical helical spring that progresses from a large diameter section at a location next to the spring support shoulder to a small diameter section, the small diameter section accepting the support stem therethrough.

4. An anti-backflow system according to claim 3 and further comprising a first ball valve connected to the vertical inlet, the first ball valve having a ball valve inlet, a ball valve outlet, and a side pressure relief port positioned between the ball valve inlet and the ball valve outlet, the side pressure relief port being plugged by a polymer plug.

5. An anti-backflow system according to claim 4 wherein said side pressure relief port is threaded and the polymer plug is threaded to the side pressure relief port.

6. An anti-backflow system according to claim 3 and further comprising a second ball valve, the second ball valve being connected to the horizontal outlet, the second ball valve having a ball valve inlet, a ball valve outlet, and a side pressure relief port positioned between the ball valve inlet and the ball valve outlet, the side pressure relief port the side relief port being plugged by a polymer plug.

7. An anti-backflow system according to claim 4 wherein said side pressure relief port is threaded and the polymer plug is threaded to the side pressure relief port.

* * * * *